Dec. 23, 1952 W. MAXWELL 2,622,933
TRACTION DEVICE FOR MOTOR VEHICLE WHEELS
Filed March 9, 1950
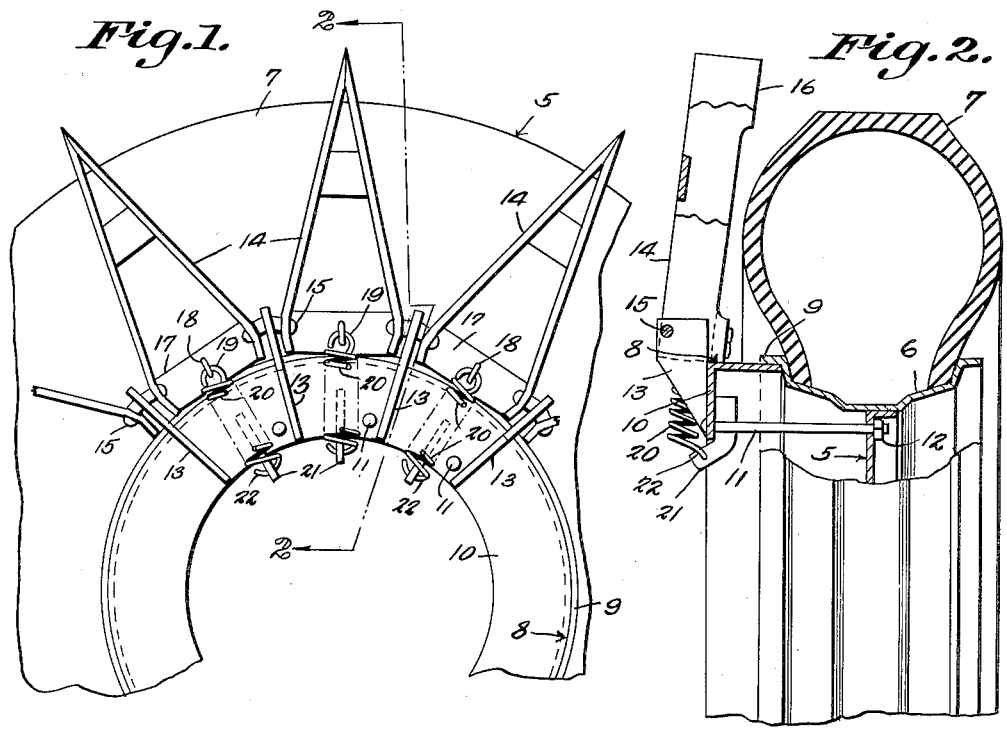
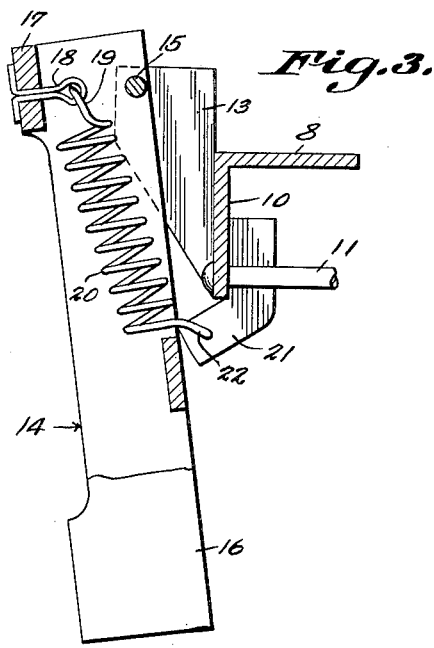
Walter Maxwell
INVENTOR
BY CA Snow & Co.
ATTORNEYS.

Patented Dec. 23, 1952

2,622,933

UNITED STATES PATENT OFFICE 2,622,933

TRACTION DEVICE FOR MOTOR VEHICLE WHEELS

Walter Maxwell, Marshfield, Wis.

Application March 9, 1950, Serial No. 148,713

1 Claim. (Cl. 301—50)

This invention relates to a traction device designed for motor vehicle wheels, the primary object of the invention being to provide means which may be permanently carried on the wheel of a motor vehicle, the means including pivoted traction lugs, which may be readily and easily swung outwardly to an active position, wherein the pointed ends thereof will extend beyond the periphery of the tire on the wheel supporting the traction device, thereby increasing the traction of the wheel.

An important object of the invention is to provide a device of this character which will be held in its active position, by the action of a spring, the spring also operating to hold the traction lug in its inactive position when folded inwardly against the side of the wheel.

Still another object of the invention is to provide a traction device of this character which may be readily and easily bolted to the side of a vehicle wheel, eliminating the necessity of making extensive alterations in the wheel construction, in order to mount the device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1 is a fragmental elevational view, illustrating a traction increasing device, constructed in accordance with the invention, as secured to a motor vehicle wheel.

Fig. 2 is a sectional view taken on line 2—2 of Fig. 1.

Fig. 3 is a sectional view through a traction lug and its supporting ring.

Referring to the drawing in detail, the reference character 5 indicates the usual motor vehicle wheel, which includes the rim 6 on which the usual pneumatic tire 7 is mounted.

The device forming the subject matter of the present invention, comprises a supporting ring 8 which is of a diameter to closely fit under the flange 9 of the rim of the wheel, the supporting ring being wide, as clearly shown by Fig. 2 of the drawing, so that it extends a substantial distance from the wheel, where it is provided with an inwardly extended annular flange 10.

Bolts 11 extend through openings in the annular flange 8, and also pass through openings in the wheel 5, the bolts being supplied with nuts 12 so that the supporting ring 8 will be securely held in position on the wheel.

The annular flange 10 also provides the support for the plates 13 that are welded thereto, the plates being arranged in spaced relation with respect to each other, with portions thereof extending beyond the flange 9, as clearly shown by Fig. 2 of the drawing.

These plates provide supports for the traction lugs 14 which are pivotally connected thereto, by means of the pivots 15. These traction lugs embody tapered members tapered towards the outer or free ends thereof, the tapered members being substantially wide as shown by Fig. 3 of the drawing, presenting wide ground-engaging portions 16 that bite into the ground surface to lend traction to the wheel.

Each of the traction lugs is provided with a bar 17 that extends across the inner end of the traction lug, the bar 17 being provided with an eye member 18 in which the hook end 19 of the coiled spring 20, is held.

Secured to the inner surface of the annular flange 8, and arranged at points opposite to the traction lugs 14, are arms 21 that have their free ends extended slightly beyond the outer surface of the annular flange 10, where the arms are provided with openings to receive the hook end 22 of the spring 20, securing the spring to the arm 21 associated therewith. As shown by Fig. 3 of the drawing, since the springs 20 of the traction lugs are connected to the bars 17 which are arranged at the pivoted ends of the traction lugs, the action of the springs 20 on the traction lugs will be to draw the traction lugs inwardly, when they have been moved to their inactive positions. It will of course be obvious that when these traction lugs are swung outwardly to their active positions, the hook ends 19 of the springs will move past dead center, exerting a pull on the traction lugs to draw them towards the tire, when they are in their extended positions, thereby holding the lugs against swinging inwardly. It will of course be understood that the strength of the springs 20 will be such as to hold the lugs in either their active or inactive positions against movement. It should also be understood that these traction devices are employed as a temporary means for lending traction to motor vehicle wheels, so that a motor vehicle, equipped with the traction device, may travel through a road surface which under normal conditions, would be impassable.

From the foregoing it will be seen that the springs 20 are so located that when they have been moved past dead center due to the movement of the traction lugs to either their active or inactive positions, the lugs will be securely held against reverse movement.

It will also be noted that the operator of a motor vehicle equipped with a traction device constructed in accordance with the invention, may readily move the traction lugs to their extended or active positions, when mud or a slippery surface is encountered and it is desired to increase the traction of the vehicle. After the vehicle has moved through the muddy or slippery surface, the traction lugs may be returned to their inactive positions, by merely pulling the lugs to cause the springs to move past dead center in the opposite direction. The lugs will now be firmly held against accidental movement to their active positions.

Having thus described the invention, what is claimed is:

In a traction device for vehicle wheels having tires mounted thereon, a wide supporting ring secured to the side of a vehicle wheel, an inwardly extended annular flange formed on the ring, a plurality of spaced plates secured to said flange, traction lugs pivotally connected with the plates, said traction lugs adapted to extend beyond the tread of the tire, lending traction to the wheel on which the traction device is positioned, a bar connected with each traction lug adjacent to the pivot end thereof, arms secured to the inner surface of the flange, the free ends of the arms extending forwardly beyond the outer surface of the flange, coiled springs connected between the arms and bars of the traction lugs, the ends of the springs being offset with respect to the vertical, whereby said springs are tensioned when the traction lugs are moved to their operative or inoperative positions, holding the traction lugs against pivotal movement.

WALTER MAXWELL.

REFERENCES CITED

The following references are of record in the file of this patent:

UNITED STATES PATENTS

| Number | Name | Date |
| --- | --- | --- |
| 901,842 | Shattuck | Oct. 20, 1908 |
| 1,278,624 | Foley | Sept. 10, 1918 |
| 1,293,746 | Foley | Feb. 11, 1919 |
| 2,207,825 | Schmeiser | July 16, 1940 |